July 19, 1949.
J. E. COOK
2,476,704
SHIPPING CONTAINER FOR AMPHIBIOUS
AND AQUATIC ANIMALS
Filed Aug. 30, 1946
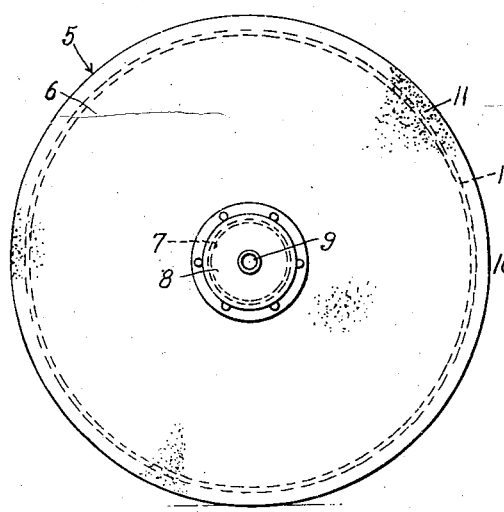
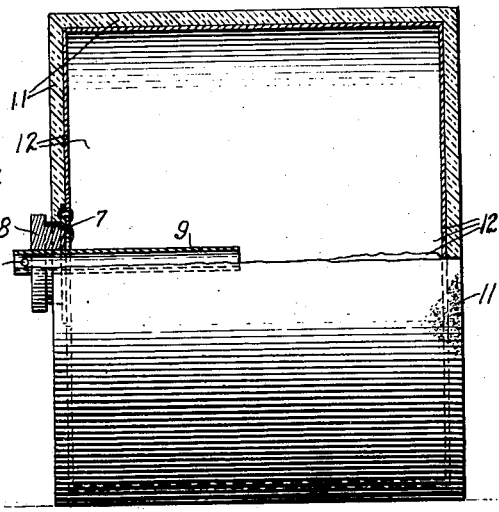
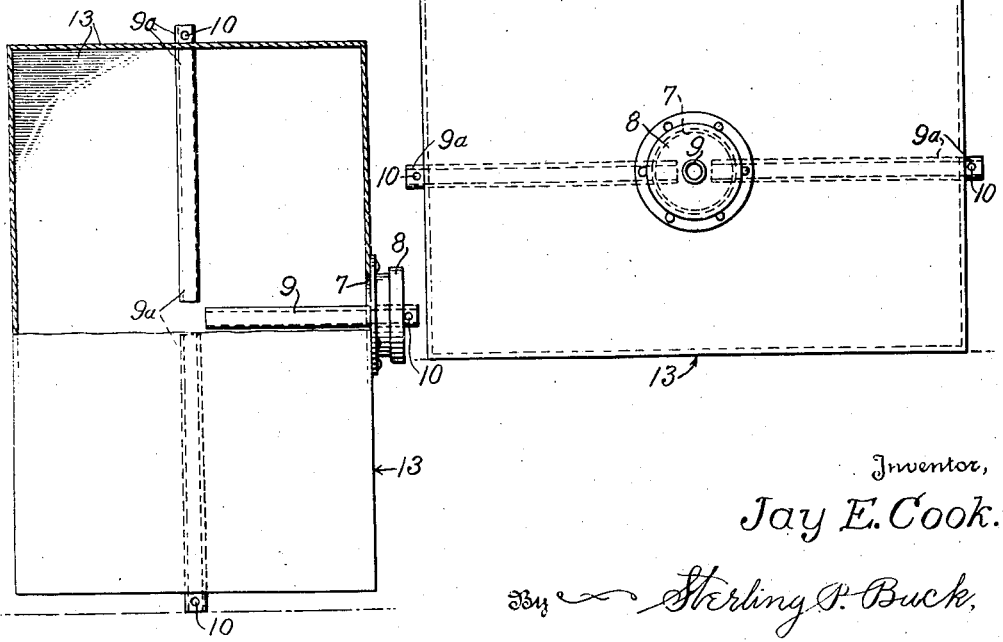
Inventor,
Jay E. Cook.
By Sterling P. Buck,
Attorney.

Patented July 19, 1949

2,476,704

UNITED STATES PATENT OFFICE 2,476,704

SHIPPING CONTAINER FOR AMPHIBIOUS
AND AQUATIC ANIMALS

Jay E. Cook, Baltimore, Md.

Application August 30, 1946, Serial No. 693,922

2 Claims. (Cl. 119—15)

This invention relates to animal containers, and especially to shipping containers for amphibious and aquatic animals.

One object of this invention is to provide a container having all sides water-tight and air-tight except for tubular connections that prevents outflow of water and permits inflow of air through openings that are considerably spaced from the respective sides of the container; so that the container will retain an adequate supply of both air and water, regardless of which side is used as the bottom and which side is used as the top, so that the water cannot damage extrinsic objects in shipment.

Another object of this invention is to provide the interior of the container with solid rests above the water level, whereon the heads and other parts of the amphibious animals can rest while breathing air.

Other objects and important features are pointed out and implied in the following details of description, in connection with the accompanying drawings in which:

Fig. 1 may be regarded as a top plan view or as a front view, that is, a view of the side that contains the normally closed inlet and outlet opening of one form of my invention.

Fig. 2 is a view of the device shown in Fig. 1, the upper half being in section.

Fig. 3 is a view of the modified form of this invention, the upper half being in section.

Fig. 4 is a view of the device shown in Fig. 3 but turned with a front or inlet side toward the observer.

Referring to these drawings in detail, in which, similar reference numerals designate similar parts throughout the several views, the invention is described in detail as follows:

In Figs. 1 and 2, the container 5 is cylindrical, and has a front or normally upper side 6 that has a central opening 7 fitted with a substantially water-tight closure 8 that is preferably screwed into the opening 7 and adapted to be quickly and easily unscrewed and removed so animals can be passed therethrough. The closure 8 is centrally apertured, and an impervious-walled straight tube 9 has its outer end-portion extending therethrough and secured to the material around this opening in water-tight relation by any appropriate means, as by relative expansion, welding, etc.

The center of the tube 9 is coaxial with the axial center of the container; so, when any portion of its convex surface is at the bottom, when it is slightly less than one-half full of water and other material, none of the water can then flow out, and air can enter freely; and if the container is then turned with the part 8 either at the upper or lower portion, the water-level will be below the inner end of the tube 9, so the water cannot flow out, but air can flow in through tube 9; this being true because the open inner end of the tube 9 terminates between and in a straight line with the center of the container and the center of the wall to which the tube 9 is secured. The outer end of the tube 9 is extended far enough beyond the closure 8 to permit an air hole or air holes 10 to be provided therein, so air will be supplied therethrough even if the outer end of the tube 9 is closed as by being stood on a floor or being covered by anything which is placed thereon; and the hole 10 permits a tie (not shown) to be passed therethrough for securing thereat a tag bearing instructions, etc., for care of the animals in the container.

The heat insulation 11 over the walls of the preferably metal container 12 prevents the animals in the container from being subjected to sudden changes in temperature. No heat insulation is shown in Figs. 3 and 4; though it is applicable thereto as to Figs. 1 and 2; but insulation is not necessary where there is slight change or slow changes in temperatures.

In the modified form of Figs. 3 and 4, the six-sided container 13 may have all six of its sides provided with tubes 9 and 9a, the tube 9 being secured to the closure 8 as in Figs. 1 and 2, but the tubes 9a being secured in opposite walls of the container and at right angles to the tube 9, all three of these tubes having their inner ends near the center of the container but spaced from the center-point in space. This arrangement not only provides several air inlets, but also provides a solid support on which a number of amphibious animals may perch or rest their heads while breathing air from above the water which has its level at or near the lower side of the tube when the cage is either in the position shown in Fig. 4 or in the inverted position; and in whatever position this form of invention is placed, the animals have at least two of the tubes to which they can cling.

This invention is not limited to the precise details of construction and arrangement as described in the foregoing for it is susceptible of numerous changes within the scope of the inventive ideas as implied and claimed.

My invention is claimed as follows:

1. An animal container that has all its sides substantially imperforate except that at least two sides are provided with substantially central openings, and at least two straight impervious-walled tubular elements having open ends, the outer end of each tubular element being in open communication with the interior of said container thru one of said openings while secured in water-tight relation to the material around said openings, each of said tubular elements having its inner end between and in a straight line with its outer end and the center of said container, adjacent to said center, said tubular elements being substantially at right-angles to one another, all substantially as described.

2. An animal container that has all its sides substantially imperforate except that at least one of said sides has an opening to receive a tubular element, and at least one straight tubular element which has open inner and outer ends and has its outer end-portion secured in water-tight relation within the material that surrounds said opening, the main portion of said tubular element having an imperforate wall and extending approximately to the center of the container, the outer end-portion of said tubular element extending a short distance outward beyond said container and having an air-inlet in its wall so air can enter the container thru said tubular element even if said outer end becomes closed.

JAY E. COOK.

REFERENCES CITED

The following references are of record in the file of this patent:

UNITED STATES PATENTS

| Number | Name | Date |
| --- | --- | --- |
| 388,444 | Prall | Aug. 28, 1888 |
| 971,570 | Shelton | Oct. 4, 1910 |
| 1,042,494 | Smith | Oct. 29, 1912 |
| D. 46,993 | Getz | Feb. 23, 1915 |
| 1,624,407 | Hamilton | Apr. 12, 1927 |
| 1,684,564 | Toppe | Sept. 18, 1928 |
| 1,932,732 | Hemple | Oct. 31, 1933 |
| 2,302,336 | Macdonald | Nov. 17, 1942 |
| 2,414,697 | Pettersson | Jan. 21, 1947 |